US008264615B2

(12) United States Patent
Sahu et al.

(10) Patent No.: US 8,264,615 B2
(45) Date of Patent: Sep. 11, 2012

(54) SPLIT EDGE ENHANCEMENT ARCHITECTURE (75) Inventors: Shilpi Sahu, Bangalore (IN); Nikhil Balram, Mountain View, CA (US); Sanjay Garg, Karnataka (IN)

(73) Assignee: Marvell World Trade Ltd. (BB)

( * ) Notice: Subject to any disclaimer, the term of this patent is extended or adjusted under 35 U.S.C. 154(b) by 544 days.

(21) Appl. No.: 12/476,930

(22) Filed: Jun. 2, 2009

(65) Prior Publication Data
US 2009/0316050 A1 Dec. 24, 2009

Related U.S. Application Data (60) Provisional application No. 61/073,949, filed on Jun. 19, 2008.

(51) Int. Cl.
*H04N 7/01* (2006.01)
*H04N 11/20* (2006.01)
*H04N 5/21* (2006.01)
*G06K 9/40* (2006.01)

(52) U.S. Cl. ........ 348/625; 348/441; 348/448; 348/628; 348/629; 382/254; 382/260; 382/266

(58) Field of Classification Search .................. 348/625
See application file for complete search history.

(56) References Cited

U.S. PATENT DOCUMENTS

| 5,420,645 | A * | 5/1995 | Traa et al. ...................... 348/626 |
| 6,246,827 | B1 * | 6/2001 | Strolle et al. ................... 386/328 |
| 6,628,842 | B1 | 9/2003 | Nagao |
| 6,717,622 | B2 * | 4/2004 | Lan ............................... 348/625 |
| 2002/0140854 | A1 | 10/2002 | Lan |
| 2003/0107678 | A1 | 6/2003 | Lin et al. |
| 2007/0160295 | A1 * | 7/2007 | Wang et al. .................... 382/199 |
| 2007/0216813 | A1 * | 9/2007 | Arici et al. .................... 348/630 |
| 2008/0158147 | A1 * | 7/2008 | Westerman et al. .......... 345/156 |
| 2008/0291332 | A1 * | 11/2008 | Messing et al. ............... 348/625 |
| 2009/0169128 | A1 * | 7/2009 | Hentschel et al. ............ 382/260 |
| 2009/0196518 | A1 * | 8/2009 | Stein et al. .................... 382/248 |

FOREIGN PATENT DOCUMENTS

| JP | H09-284604 | 10/1997 |
| JP | 2004-527171 | 9/2004 |
| JP | 2007-295224 | 11/2007 |
| WO | 02/080543 | 10/2002 |
| WO | 20050116922 A1 | 12/2005 |

OTHER PUBLICATIONS

Lin Ping, "An Adaptive Color Transient Improvement Algorithm", IEEE Transactions on Consumer Electronics, pp. 1326-1329, vol. 49, No. 4, Nov. 2003.
Yuki Ishii, et al., "Image Magnification Based on the Multiplicative Skeleton/Texture Separation", 2006 Image Media Processing Symposium (IMP2006), Japan, Nov. 8, 2006.
International Search Report and Written Opinion issued by the European Patent Office as the International Searching Authority, dated Jun. 2, 2009.
Office Action for Japanese Application No. 2011-511906 issued by the Japanese Patent Office, dated Jan. 24, 2012.

* cited by examiner

Primary Examiner — Justin Shepard (57) ABSTRACT

A system and method for enhancing the detail edges and transitions in an input video signal. This enhancement may be accomplished by enhancing small detail edges before up-scaling and enhancing large amplitude transitions after up-scaling. For example, detail edge enhancement (detail EE) may be used to enhance the fine details of an input video signal. An edge map may be used to prevent enhancing the large edges and accompanying mosquito noise with the detail enhancement. Noise may additionally be removed from the signal. After the fine details are enhanced, the signal may be up-scaled. Luminance transition improvement (LTI) or chrominance transition improvement (CTI) may be used to enhance the large transitions of the input video signal post scaler.

12 Claims, 6 Drawing Sheets

SPLIT EDGE ENHANCEMENT ARCHITECTURE

CROSS-REFERENCE TO RELATED APPLICATIONS

This application claims the benefit of priority from U.S. provisional patent application Ser. No. 61/073,949, filed Jun. 19, 2008, entitled SPLIT EDGE ENHANCEMENT ARCHITECTURE. That provisional application is hereby incorporated by reference in its entirety.

BACKGROUND

1. Field

Aspects of the present invention relate generally to the field of video coding and more specifically to image detail and edge enhancement.

2. Description of the Related Art

An edge enhancer comprising both fine detail enhancement (detail EE) and luminance transition improvement (LTI) may be used to improve the transitions in a video signal. Applied in parallel, detail EE on the small transitions and LTI on the large transitions, the output of an edge enhancer is the sum of the original signal ($Y_{in}$), the detail enhancement ($\Delta Y_{det}$) and the transition improvement ($\Delta$LTI). Detail EE uses the principles of un-sharp masking and causes overshoot or ringing on edges that can enhance small details.

Up-scaling is typically necessary when an input video signal is standard definition (SD), often 480i, and the desired output is high definition (HD), usually 1080i or 1080p. Up-scaling has the effect of enhancing artifacts or imperfections that may exist or be introduced in the video signal. Therefore, when up-scaling a signal, it may be important to verify that the actual details in the video image are enhanced rather than enhancing and propagating imperfections.

When a signal is up-scaled, detail EE performance may be compromised because the overshoot and ringing caused by the enhancement can result in added mosquito noise and augment stray artifacts in the image. Additionally, up-scaling often results in a softening of the image and of the finer details because the higher frequencies in the un-scaled video translate to lower frequencies in the up-scaled video. To implement an effective detail EE after scaling (post-scaler), a new filter design would be required to enhance the frequencies where the real details exist after scaling and would result in a much larger filter that would need to change based on the up-scaling ratio. Therefore detail EE is more effective when implemented before up-scaling.

LTI is a non-linear algorithm for improving transition sharpness on large amplitude edges without causing overshooting or ringing. However, LTI does not noticeably improve small transitions. LTI may artificially introduce frequencies that can create artifacts and introduce aliasing or pixellations known as "jaggies" so LTI is most effective when applied post scaler because the up-scaled signal's frequency spectrum contains space for the added frequencies. Furthermore, the added artifacts and jaggies are more obvious after the enhanced video is up-scaled. Therefore, when an edge enhancer comprising both detail EE and LTI is applied pre-scaler, the LTI enhancement does not work as expected, and when applied post-scaler, the detail EE does not work as expected.

SUMMARY

Embodiments of the present invention provide a system and method for enhancing the detail edges and transitions in an input video signal. The method may be accomplished by enhancing a plurality of small details in an input video signal, scaling the enhanced video signal, and enhancing a plurality of large amplitude transitions after up-scaling. Detail edge enhancement (detail EE) may be used to enhance fine details and luminance transition improvement (LTI) or chrominance transition improvement (CTI) may be used to enhance large transitions. Separation of the detail enhancement and the large edge enhancement may be accomplished by enhancing the fine details and then up-scaling the signal, and separately up-scaling the input video signal then enhancing the large transitions, then combining the two enhanced, up-scaled signals. Enhancing the fine details of the signal may include filtering, reducing noise contained in the signal, and gaining the input video signal. Detail enhancement may include using a large edge map to prevent enhancing the large edges and accompanying mosquito noise. Enhancing large amplitude transitions may include calculating a second derivative of the scaled video signal, creating a pixel kernel from the pixels of the scaled signal, determining the minimum and maximum pixel values in the pixel kernel, and biasing the scaled signal towards the maximum pixel value if the second derivative is a positive number, or towards the minimum pixel value if the second derivative is a negative number. The system may contain components suitable for performing such a method, but may not be limited to such performance.

BRIEF DESCRIPTION OF THE DRAWINGS

The present invention is described herein with reference to the accompanying drawings, similar reference numbers being used to indicate functionally similar elements.

DETAILED DESCRIPTION OF EMBODIMENTS

Objects and advantages of the present invention will become apparent from the following detailed description.

Figure 1A:
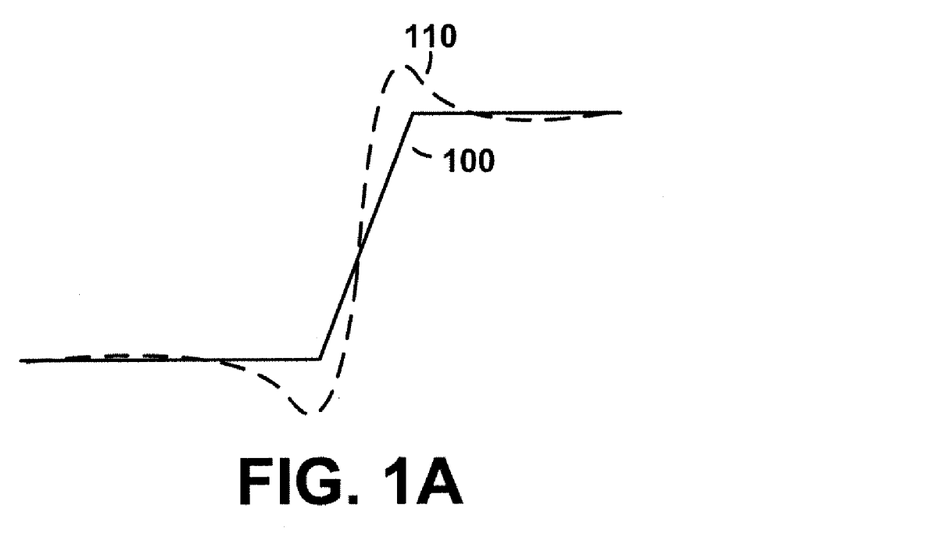
FIGS. 1A and 1B show the effect of different kinds of enhancement on a transition.
Figure 1B:
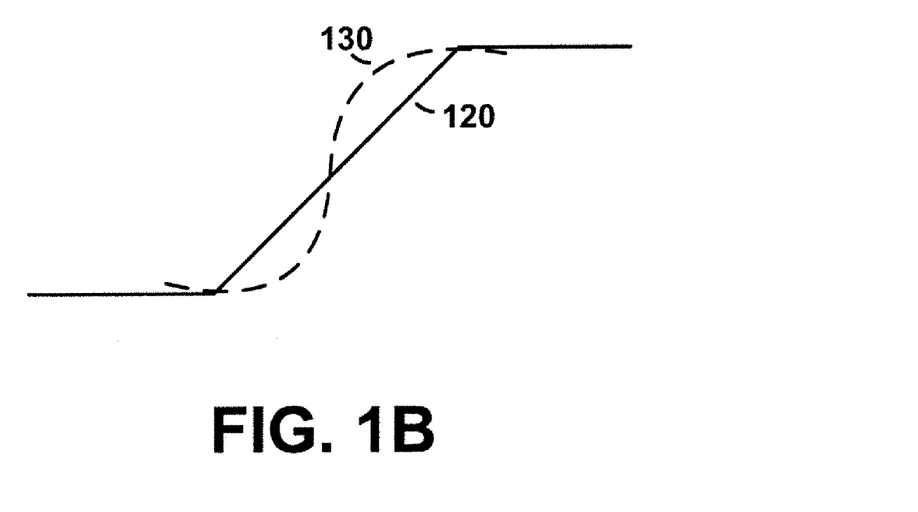

The split edge enhancer may separate fine detail enhancement (detail EE) and luminance transition improvement (LTI) such that detail EE can occur pre-scaler and LTI can occur post-scaler. The effect of detail EE on a transition is shown in FIG. 1A. The original feature 100 may be enhanced in 110 by detail EE so as to emphasize the transition. While this emphasis is beneficial on fine details and textures composed of low amplitude edges, such enhancement is undesirable on large transitions. The effect of LTI on a transition is shown in FIG. 1B. The original feature 120 may be enhanced in 130 by LTI so as to emphasize the transition.

Figure 2:
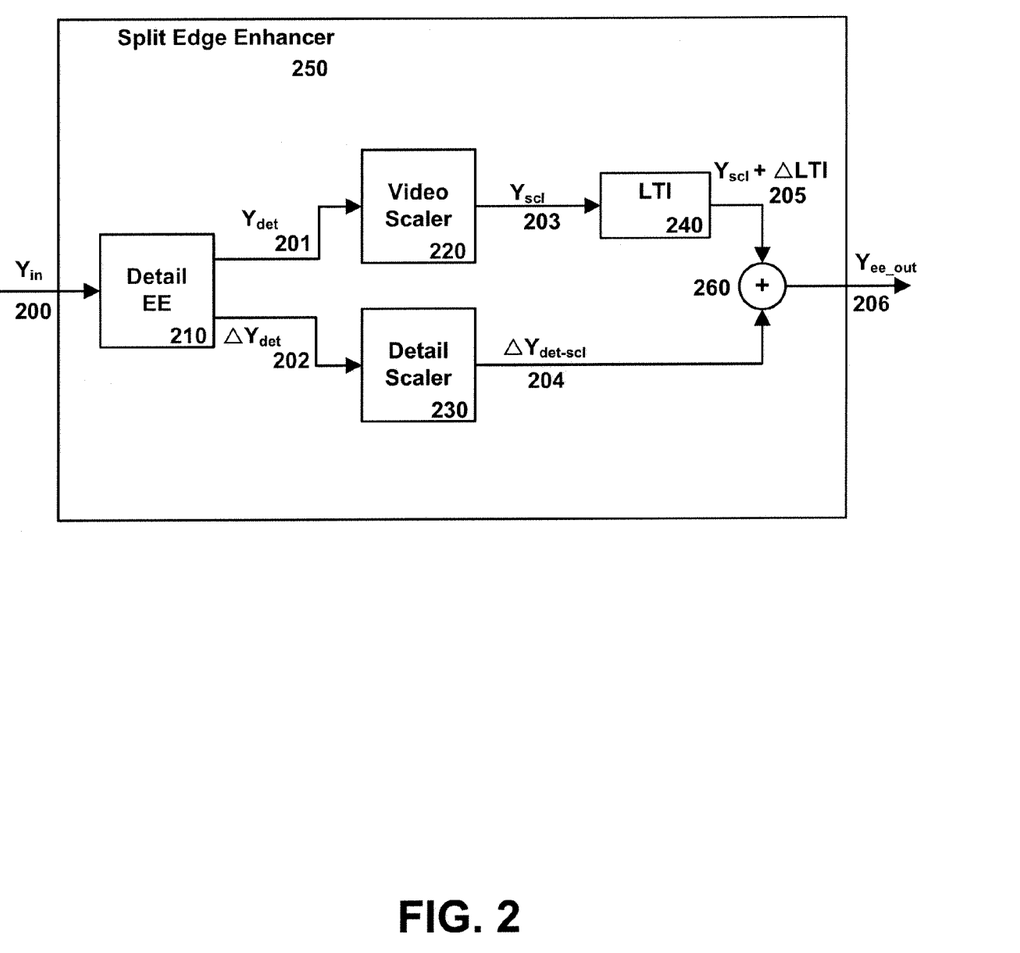
FIG. 2 shows a simplified block diagram of one embodiment of split edge enhancement architecture.

FIG. 2 illustrates an embodiment of split edge enhancement architecture. A video signal $Y_{in}$ 200 may be input into a split edge enhancer 250 comprising both a detail EE module 210 and an LTI module 240. Video signal $Y_{in}$ 200 may first be input into detail EE module 210. Detail EE module 210 may output a detail signal, $\Delta Y_{det}$ 202, which may represent the enhanced fine details of the video signal. Detail signal $\Delta Y_{det}$ 202 may then be up-scaled at detail scaler 230 and post-scaler signal $\Delta Y_{det\text{-}scl}$ 204 may be output. Another output of detail EE module 210 may be $Y_{det}$ 201. $Y_{det}$ 201 may be input video signal $Y_{in}$ 200 passed through detail EE module 210 without adjustment, or $Y_{det}$ 201 may be detail signal $\Delta Y_{det}$ 202 added to input video signal $Y_{in}$ 200 to create a video signal with fine details enhanced. $Y_{det}$ 201 may then be up-scaled through video scaler 220, and scaled signal $Y_{scl}$ 203 may then be input into transition improvement module LTI 240. The two scalers, 220 and 230, may further contain filters that may have the same or different scaler filters. Scaled signal $Y_{scl}$ 203 plus the LTI improvement $\Delta$LTI output may be the output ($Y_{scl}+\Delta$LTI 205) of LTI module 240. Output signal $Y_{scl}+\Delta$LTI 205 may then be added to scaled detail enhanced signal $\Delta Y_{det\text{-}scl}$ 204 in the spatial domain at 260 such that the final output of split edge enhancer 250, $Y_{ee\text{-}out}$ 206 may be the edge enhanced and scaled signal.

Figure 3:
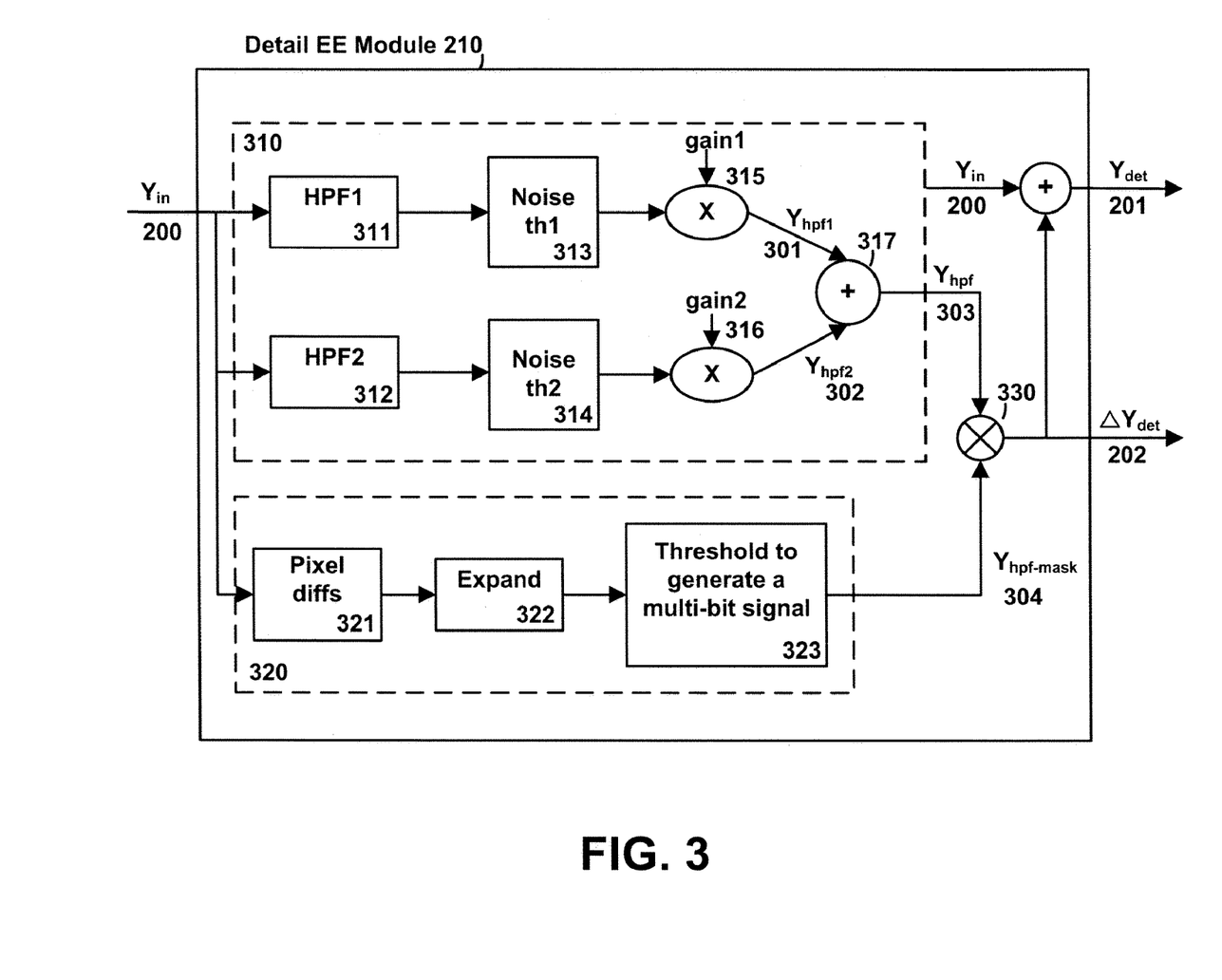
FIG. 3 shows a simplified block diagram illustrating components of one embodiment of a fine detail enhancer.

FIG. 3 illustrates an embodiment of a fine detail enhancer 210. There are two primary components to detail enhancer 210: a detail calculator 310 and a large edge map 320. Detail calculator 310 works on the principle of un-sharp masking. As such, input video signal $Y_{in}$ 200 is passed through a filter. As shown, input video signal $Y_{in}$ 200 may be passed through two parallel high pass filters (HPF) 311 and 312, one for horizontal edges and the other for vertical edges. Alternatively, a 2D omni-directional filter, or a band pass filter (BPF) to limit artifacts such as mosquito noise may be used. The separate paths may additionally consist of noise filters 313 and 314. Here, noise filter 313 or 314 may subtract a noise threshold, th1 or th2, from the signal amplitude. The thresholds may be programmable based on the amount of noise in a given video feed. The threshold values may be stored in programmable registers and may be a constant value selected by a user. Additionally, there are several known methods for estimating the noise contained in a video signal, for example block based, smoothing based, or wavelet based noise estimation may be implemented to determine the amount of noise in a video signal. The noise contained in input video signal $Y_{in}$ 200 may be estimated in the video coding system and provided to split edge enhancer 250 via programmable registers to adjust programmable noise thresholds th1 and th2. The signal may then be multiplied by programmable gains 315 and 316 to yield output signals $Y_{hpf1}$ 301 and $Y_{hpf2}$ 302. The programmable gains may be constant values stored in programmable registers. Outputs of the two paths, $Y_{hpf1}$ 301 and $Y_{hpf2}$ 302, may then be added together by adder 317 to yield final detail signal $Y_{hpf}$ 303.

Detail signal $Y_{hpf}$ 303 generated by detail calculator 310 may contain undesirable ringing at the large amplitude edges. To correct for any undesirable enhancement on large transitions, a second portion of detail EE module 210, large edge map 320, may use an edge map to differentiate between fine details and large transitions. A large edge map can cover the large edges and may typically also cover the mosquito noise prevalent near large edges so that the detail signal is not enhanced in those areas. In large edge map 320, pixel differentiator 321 may evaluate pixels in the video signal image to identify large edges or transitions. Those pixels identified as belonging to a large edge may be selected to create an edge map. The edges may then be expanded horizontally and vertically at module 322 to confirm that the edges and any surrounding mosquito noise are well covered by the edge map. To expand the edges of an edge map, additional pixels surrounding an identified large edge, horizontally and vertically, are also selected as part of the edge. The resulting edge map may then reflect the inclusion of the additional pixels as part of the identified edges. The signal may then be thresholded to generate a multi-bit signal at module 323. The multi-bit signal may be a 0-16 bit signal, correspondingly, there may be up to 15 threshold values used to determine the multi-bit signal. The threshold values may be stored in programmable registers. Alternatively, the thresholds may be determined by a base/step method wherein the first threshold is the base level and each additional threshold is a step up from the base. The output of large edge map 320, $Y_{hpf}$ mask 304, may be an edge map. When combined with detail signal $Y_{hpf}$ 303 at module 330, the result detail signal $\Delta Y_{det}$ 202 may be the gained fine details of the input video signal $Y_{in}$ 200 without enhancements on the large edges. As shown in FIG. 3, if the result detail signal $\Delta Y_{det}$ 202 is added to input video signal $Y_{in}$ 200, signal $Y_{det}$ 201 may be a complete detailed signal.

Referring back to FIG. 2, after passing through detail EE module 210, signal $Y_{det}$ 201 may be up-scaled at video scaler 220. Although it is possible to implement edge enhancement without scaling, up-scaling the video signal is often required when the desired output signal is 1080p or 1080i as most source video is 480p, 680p, or possibly 720p. As previously mentioned, up-scaling usually results in a softer image and a loss of the finer details. This is because up-scaling typically involves a low pass filter (LPF) which can cause degradation of the edges. However, with the earlier gaining of the detailed signal in detail EE module 210, the degradation of detail signal $\Delta Y_{det}$ 202 may be minimal. When the fine details are gained up at 315 and 316, attenuation due to low pass filtering may be limited, and more fine details may persist than would otherwise be the case. Additionally, real details of a video signal often contain a good spread of frequencies; primarily around band pass and high pass frequency regions. Consequently, an LPF in scalers 220 or 230 may attenuate only some of the higher frequencies, leaving most of the detail features undisturbed.

Figure 4:
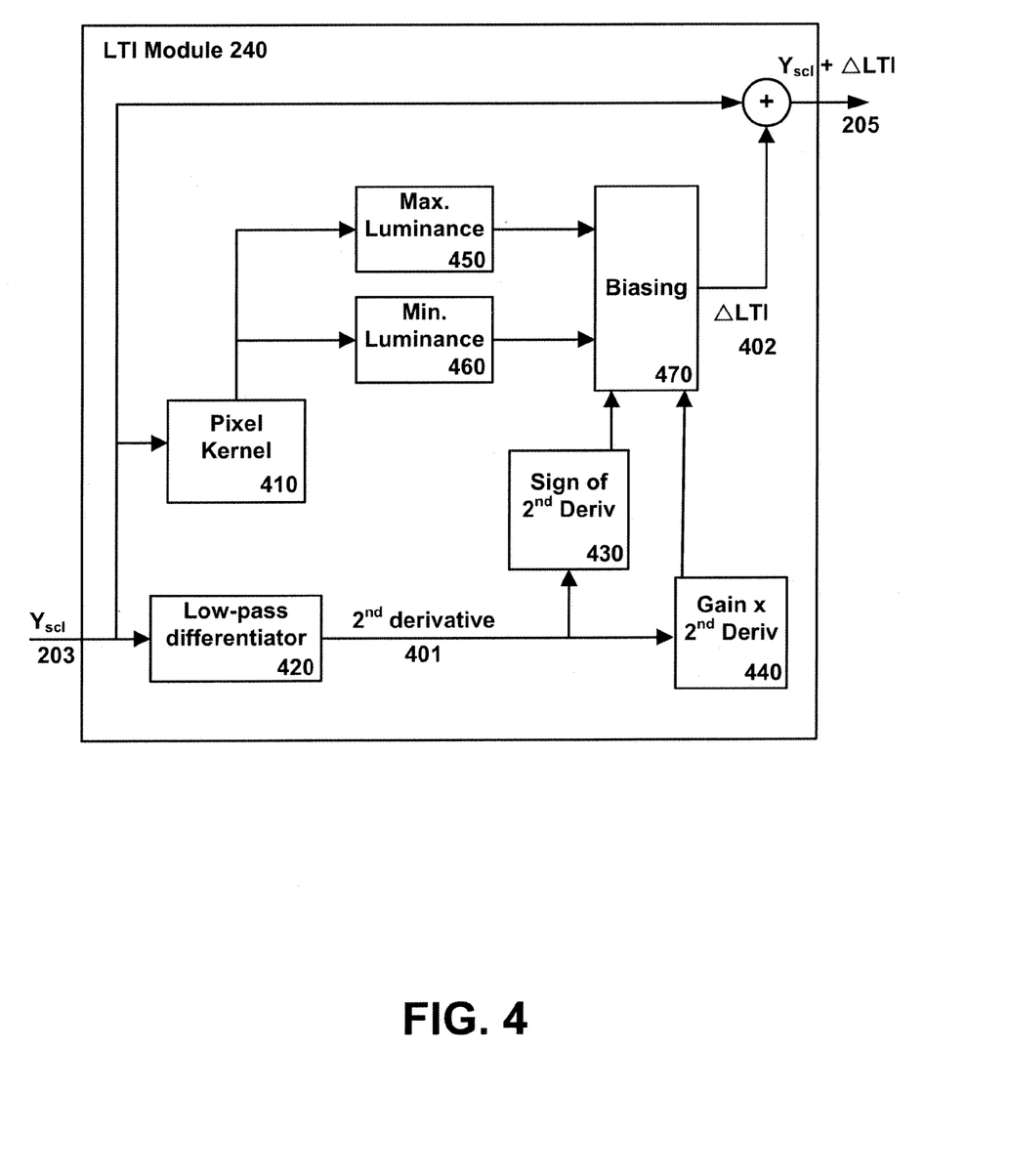
FIG. 4 shows a simplified block diagram of one embodiment of a luminance transition improvement module.

Luminance transition improvement (LTI) may be applied after up-scaling to mitigate any softening of the image that can be caused by the scaling filter. LTI can be applied in both the horizontal and vertical directions. In one embodiment, horizontal improvement can be achieved by LTI module 240 as shown in FIG. 4. Scaled signal $Y_{scl}$ 203 may be passed through a low pass differentiator 420 in the horizontal direction to yield second derivative equivalent 401 of the low pass filtered signal. Low pass differentiators are known in the art, for example a differentiator may be implemented with a simple RC circuit. The second derivative equivalent 401 may be quite small for fine details, especially after scaling and filtering the signal. This additionally may have the benefit of ensuring that LTI module 240 does not significantly affect the fine details of the video signal. A kernel may then be formed at module 410 around a pixel of interest, for example, a kernel consisting of 7 pixels may be sufficient. The maximum and minimum luminance values of the pixels in the kernel may then be determined at modules 450 and 460 respectively.

Second derivative equivalent 401 may have both a sign and a magnitude. At module 430, the sign of second derivative equivalent may be determined. If, at module 430, second derivative equivalent 401 is less than zero, the sign is negative and scaled signal $Y_{scl}$ 203 can be biased towards the minimum luminance value determined at module 460. If, at module 430, second derivative equivalent 401 is equal to zero, no biasing is required. If, at module 430, second derivative equivalent 401 is greater than zero, the sign is positive and scaled signal $Y_{scl}$ 203 may be biased towards the maximum luminance value determined at module 450.

The magnitude of second derivative equivalent 401 may be used to calculate the amount of bias that may be applied to scaled signal $Y_{scl}$ 203. The amount scaled signal $Y_{scl}$ 203 is biased at module 470 may be determined as the product of a programmable gain value and the magnitude of second derivative equivalent 401 calculated at module 440. The programmable gain value may be a constant value stored in a programmable register. Biasing the signal using second derivative equivalent 401 allows a transient improvement that may gradually increase with the edge amplitude to yield a natural looking LTI output. The output of LTI module 240 may be the input to the module, scaled signal $Y_{scl}$ 203 plus the LTI improvement, $\Delta$LTI 402 to yield output signal $Y_{scl}+\Delta$LTI 205.

Figure 5:
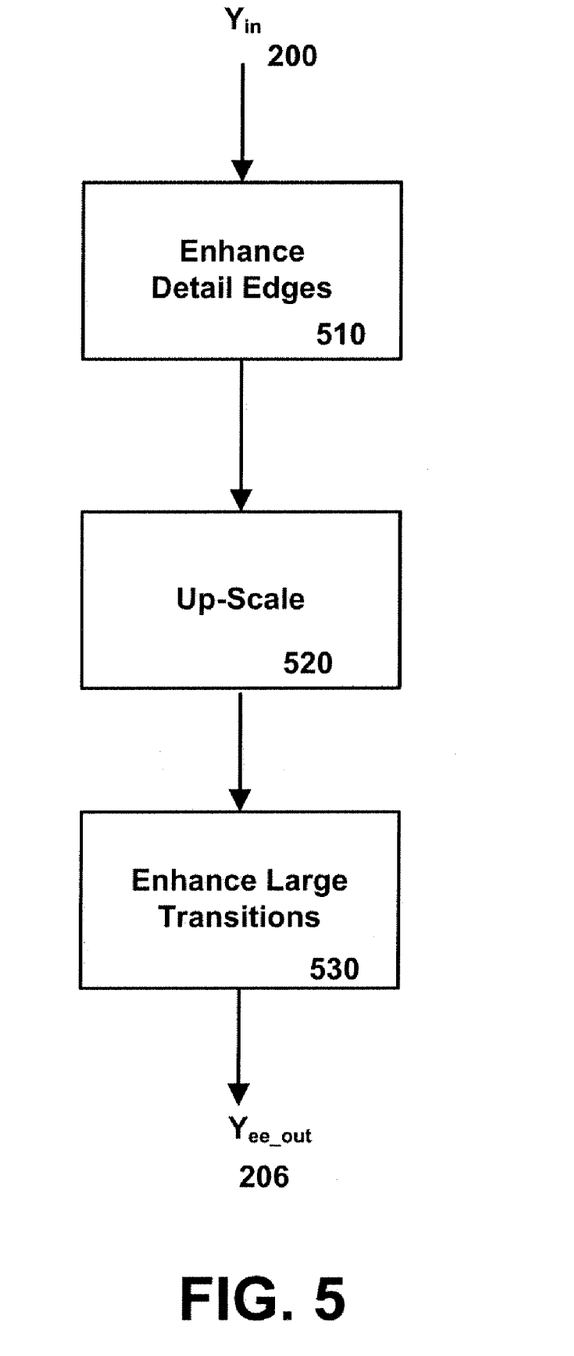
FIG. 5 is a simplified flow diagram illustrating general operation of one embodiment of a method of enhancing a video signal with split edge enhancement architecture.

FIG. 5 is a simplified flow diagram illustrating general operation of one embodiment of a method of enhancing a video signal with split edge enhancement architecture. Splitting the enhancement of fine detail edges in a video signal and the enhancement of large transitions with a scaler may provide for edge enhancement with minimal enhancement of inherent or introduced artifacts. At block 510, the fine details of input video signal $Y_{in}$ 200 may be enhanced. This may be accomplished with detail EE. At block 520, the detail enhanced signal may be up-scaled. At block 530, the large transitions in the up-scaled signal may then be enhanced. This may be accomplished with LTI to improve luminance transitions in the up-scaled signal, outputting LTI and detail EE enhanced up-scaled output signal $Y_{ee\_out}$ 206.

Figure 6:
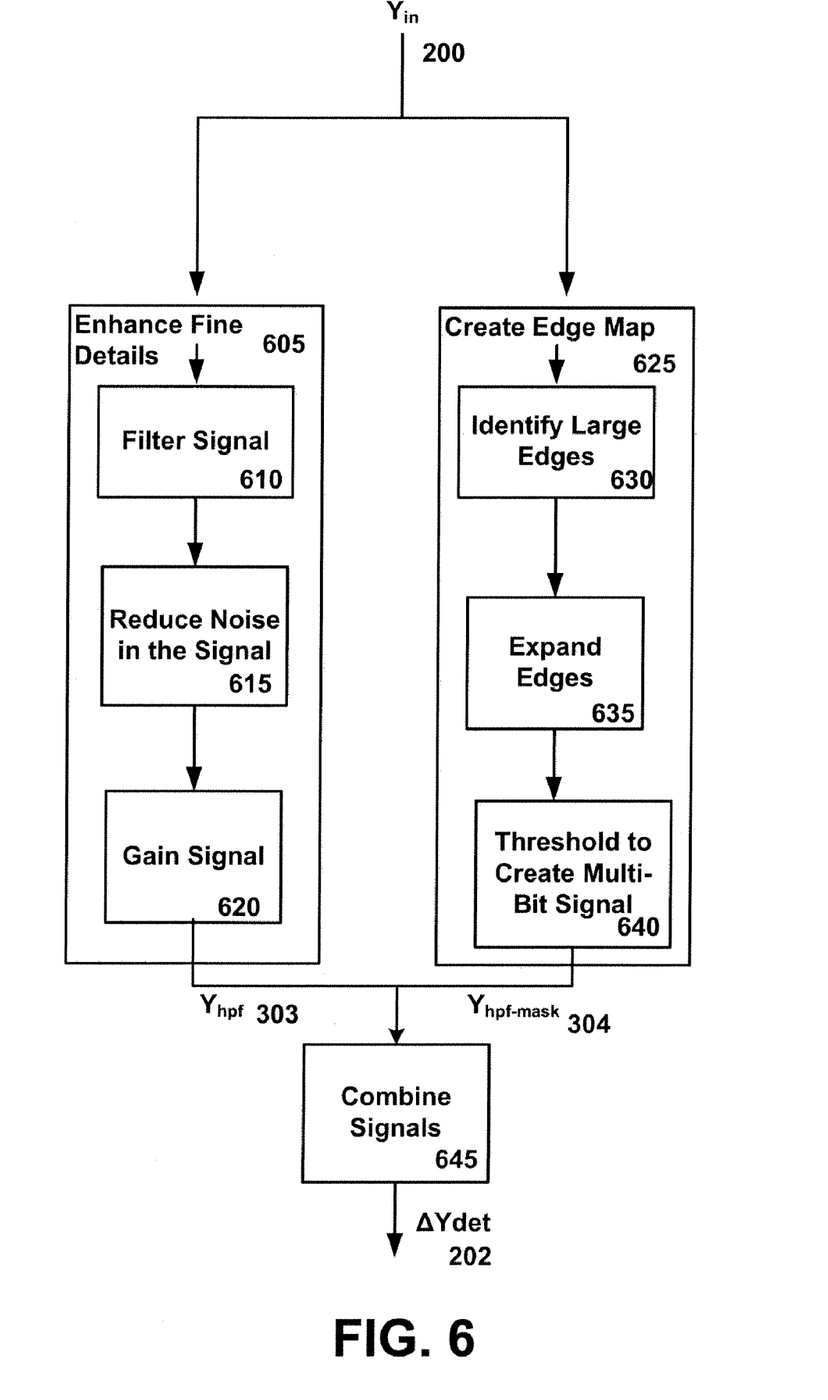
FIG. 6 is a simplified flow diagram illustrating general operation of one embodiment of a method of enhancing fine detail edges of a video signal with a detail edge enhancer.

FIG. 6 is a simplified flow diagram illustrating general operation of one embodiment of a method of enhancing fine detail edges of a video signal. At block 605, the fine details of input video signal $Y_{in}$ 200 may be enhanced. This may be accomplished with detail EE. The operation of detail edge enhancement block 605 may further include block 610 that may filter input video signal $Y_{in}$ 200, block 615 that may reduce noise in the filtered signal, and block 620 that may provide gain to the noise reduced signal. Filtering the input video signal $Y_{in}$ 200 at block 610 may be executed with a suitable filter, for example a high pass filter (HPF), a 2D omni-directional filter, or a band pass filter (BPF) to limit artifacts in the signal. Reducing noise in the filtered signal at block 615 may be executed with known noise filters, or by removing a programmable noise threshold value from the filtered signal. A programmable noise threshold may be determined by known methods, for example by wavelet based, block based, or smoothing based methods for estimating noise in a signal. Gaining the filtered signal at block 620 may be completed by multiplying the filtered and noise reduced signal with a programmable gain. Edge enhancement block 605 may then output a filtered, noise reduced, gained signal $Y_{hpf}$ 303.

Detail enhancement of large transitions may be undesirable; therefore, at block 625, detail edge enhancement may further include creating an edge map to differentiate between fine details and large transitions. A large edge map can cover the large edges and may typically also cover the mosquito noise prevalent near large edges so that the detail signal is not enhanced in those areas. Creating a large edge map at operational block 625 may further include blocks 630, 635 and 640. At block 630, pixels in input video signal $Y_{in}$ 200 may be evaluated to identify large edges or transitions. Those pixels identified as belonging to a large edge may be selected to create an edge map. At block 635, edges in the edge map may be expanded horizontally and vertically so that the identified edges and any surrounding mosquito noise are well covered by the edge map. To expand the edges of an edge map, additional pixels surrounding an identified detail edge, horizontally and vertically, may also be selected as part of the edge. The resulting edge map may then reflect the inclusion of the additional pixels as part of the identified edges. At block 640, the signal may then be thresholded to generate a multi-bit signal. Output of edge map creation block 625 may be edge map $Y_{hpf-mask}$ 304. Detail signal $Y_{hpf}$ 303 and edge map $Y_{hpf-mask}$ 304 may be combined at block 645 to output result signal $\Delta Y_{det}$ 202 that may have gained fine details without enhancements on the large edges.

It is noted that the arrangements of the blocks in FIG. 5 and FIG. 6 do not necessarily imply a particular order or sequence of events, nor is it intended to exclude other possibilities. For example, the operations depicted at 610 and 615 or at 630 and 635 may occur substantially simultaneously with each other.

Although the above embodiments have been described as being primarily for luminance signal enhancement, they could also be applied to chrominance signal enhancement.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A system comprising:
   a detail edge enhancer that comprises a first filter, a first noise reducer, a first gain multiplier, a second filter, a second noise reducer, a second gain multiplier and a first adder, wherein:
   (i) the detail edge enhancer is configured to receive a video signal that includes a plurality of fine detail edges,
   (ii) the first filter, first noise reducer, and the first gain multiplier are configured to enhance the plurality of fine detail edges of the received video signal horizontally to create a horizontal output signal, wherein the first noise reducer is configured to subtract a noise threshold from a noise level of the received video signal,
   (iii) the second filter, second noise reducer, and the second gain multiplier are configured to enhance the plurality of fine detail edges of the received video signal vertically to create a vertical output signal, and
   (iv) the first adder is configured to combine the horizontal output signal and the vertical output signal to generate a combined output signal;
   an edge map generator that comprises a pixel differentiator, an expander, and a threshold generator, wherein the pixel differentiator, the expander, and the threshold generator are configured to create an edge map of the received video signal;
   a second adder configured to combine the combined output signal with the edge map to generate a detail enhanced video signal;
   a first scaler configured to scale the detail enhanced video signal; and
   a transition enhancer configured to apply transition improvement to a plurality of transitions in the scaled video signal.

2. The system of claim 1 wherein the transition improvement comprises luminance transition improvement (LTI) or chrominance transition improvement (CTI).

3. The system of claim 1 wherein the transition improvement is applied to the scaled video signal both horizontally and vertically.

4. The system of claim 1 wherein:
the first scaler comprises a first filter; and
the system further comprises a second scaler with a second filter;
wherein the second scaler is applied to the received video signal to create a second scaled signal, the transition improvement is applied to the second scaled signal to create a transition enhanced signal, and the scaled video signal is combined with the transition enhanced signal to create an output signal.

5. The system of claim 4 wherein the first filter and the second filter have filter coefficients that are the same.

6. The system of claim 1 wherein the first filter and second filter are selected from the group consisting of high pass filters and band pass filters.

7. The system of claim 1 wherein the transition enhancer further comprises:
a differentiator;
a biaser; and
a multiplier;
wherein the differentiator creates a second derivative of the scaled video signal, the multiplier creates a bias value combining the second derivative and a gain value, and the biaser uses the bias value to adjust the scaled input signal.

8. The system of claim 4 wherein the first filter and the second filter have filter coefficients that are different.

9. A method for enhancing a received video signal, the method comprising:
receiving a video signal that includes a plurality of fine detail edges and a plurality of large edges;
evaluating the received video signal to identify the plurality of large edges to generate an edge map;
enhancing the plurality of fine detail edges of the received video signal horizontally to generate a horizontal output signal;
enhancing the plurality of fine detail edges of the received video signal vertically to generate a vertical output signal;
combining the horizontal and vertical output signals to generate a detail signal; and
combining the detail signal and the edge map to generate a detail enhanced video signal without enhancements on the large edges.

10. The method of claim 9, further comprising:
scaling the detail enhanced video signal; and
applying a transition improvement to the scaled detail enhanced video signal.

11. The method of claim 10, wherein the transition improvement comprises luminance transition improvement (LTI) or chrominance transition improvement (CTI).

12. The method of claim 10, wherein the transition improvement is applied to the scaled detail enhanced video signal both horizontally and vertically.

* * * * *